3,276,949
TABLETS COMPRISING CALCIUM HYPOCHLORITE AND SODIUM SULFATE AND METHOD OF PREPARATION

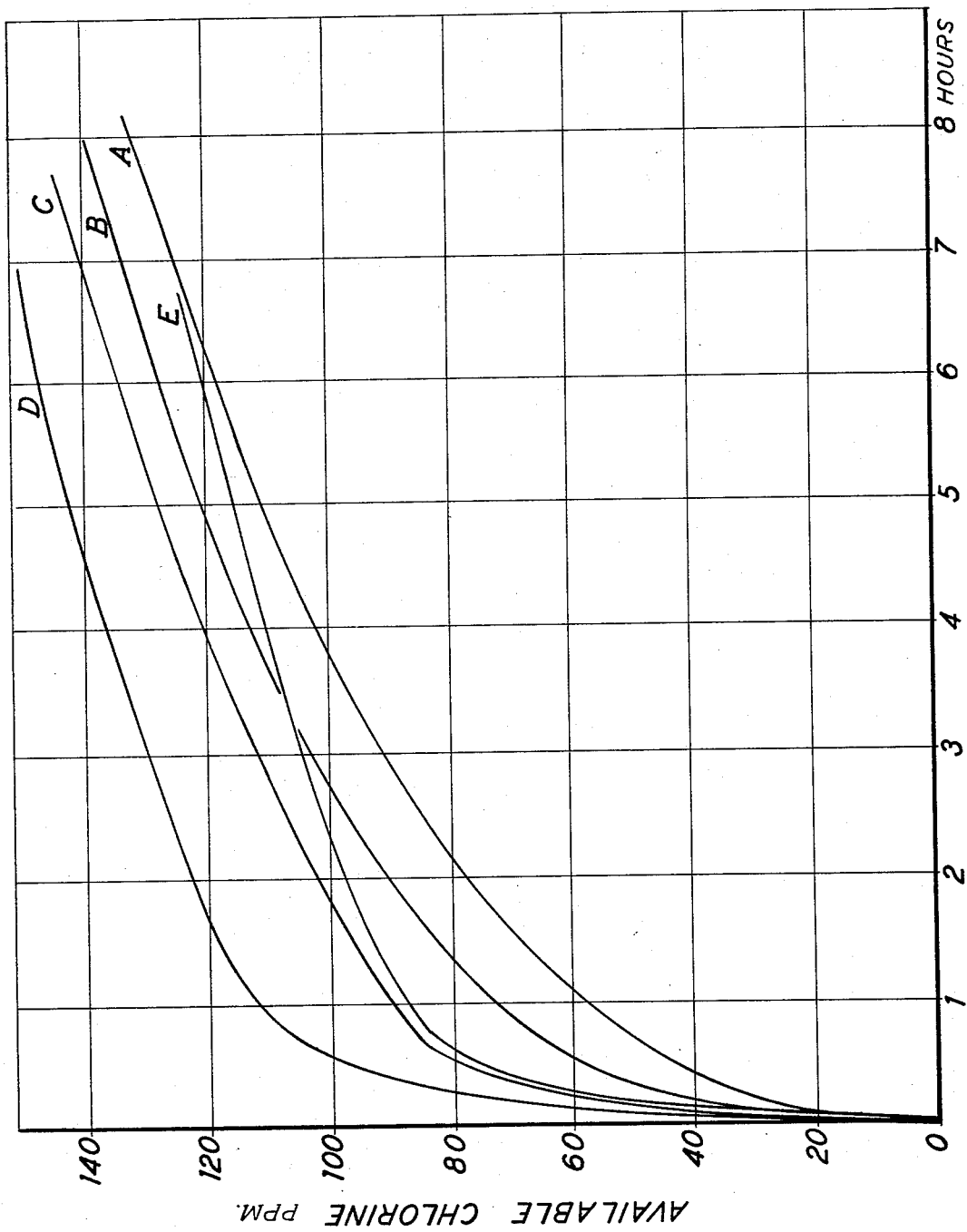

Homer L. Robson, New Haven, Conn., and Roy H. Hodges, Welling, Kent, England, assignors to Olin Mathieson Chemical Corporation, a corporation of Virginia
Filed May 7, 1963, Ser. No. 278,553
10 Claims. (Cl. 167—18)

This invention relates to novel tablets compounded of calcium hypochlorite and sodium sulfate and to processes of preparing them. More particularly it relates to compound tablets of calcium hypochlorite, sodium sulfate and inert diluent salts in tablets so constructed that when placed in water, a part of the sodium hypochlorite formed by reaction between the sodium sulfate and the calcium hypochlorite initially leaches out rapidly and a part leaches out slowly. The novel article of this invention finds particular utility in water treatment.

In the washing of glasses and dishes, as in restaurants and bars, a germicidal rinse is usually required by the pertinent health authorities. Regulations may require that the rinse water contain 50, 75, or even 100 parts per million (p.p.m.) of available chlorine or its equivalent in germ killing power. Normally the pH of germicidal rinse is specified within a few pH units, usually about 8.5. It is also required that the rinse water maintain a specified minimum available chlorine during the period of use. Normally the use period is also specified as one shift or eight hours, more or less.

A three-tank sink is usually required. The glassware or dishes are washed in the first sink, and rinsed in the second in running water. Then they are dipped in a germicidal rinse in the third tank and drained. The first rinse in running water reduces the amount of contaminating material remaining on the glassware to a small amount. In the germicidal rinse, chlorine demand per hour may be only 3 to 10 p.p.m. of available chlorine. A considerable dose of germicidal agent brings the rinse tank up to the required minimum and subsequently only a small amount of additional available chlorine is continuously supplied. If the total required available chlorine, several hundred parts per million, were introduced initially, the solution retained on the glass could convey a chlorinous taste to a drink served soon after rinsing. For this reason the available chlorine should not exceed, say 125 p.p.m. where the required minimum is 50 p.p.m. or about 150 p.p.m. where the required minimum is higher.

The article of this invention is useful for these purposes as it can be designed to yield the minimum available chlorine content rapidly and to provide a subsequent slow release of available chlorine which will not bring the available chlorine in the germicidal rinse tank above an appropriate maximum content. The article of this invention is also useful in the treatment of water for other uses including swimming pools and drinking water.

Purification of water can be effectively accomplished by the introduction of calcium hypochlorite even when it is highly contaminated. However, calcium hypochlorite may react with soaps to form undesirable films on glassware or to form products which in the treatment of large quantities of water, seriously impede filtration. For this reason, although the hypochlorite is stored and shipped as a solid in the form of calcium hypochlorite, it is desirable to add sodium hypochlorite, or mostly sodium hypochlorite, in water treatment processes.

Sodium hypochlorite, however, does not have sufficient stability for either storage or shipment. In solid form, it is explosive. Commercially, it is available as household bleach solutions containing only about 5 percent of available chlorine. Solutions containing 12 to 15 percent sodium hypochlorite have so short a life that they are usually obtained by the user from the manufacturer immediately before use.

For these reasons, hypochlorite is stored and shipped in the form of calcium hypochlorite compositions in which the loss of chlorine in storage and shipment is small. To prepare sodium hypochlorite, calcium hypochlorite is dissolved in water, sodium carbonate or sodium sulfate is added, the precipitate is settled and the clear supernatant liquor is decanted.

U.S. Patent 1,678,987, issued to James D. MacMahon on July 31, 1928 described the preparation, use and stability of mixtures of anhydrous sodium sulfate with calcium hypochlorite. When the mixture of the patent is added to water, it forms a suspension of calcium sulfate which is settled and the clear solution of sodium hypochlorite is decanted. This procedure requires time, equipment and the recovery of the available chlorine is frequently incomplete. The resulting solution added to water to be treated may introduce less available chlorine than expected. Dry solid calcium hypochlorite compositions are needed, having their known advantages of stability and high available chlorine content, avoiding shipment of large proportions of water and, in addition, having predetermined dosage and rapid dissolution, avoiding introduction of calcium when added to water.

A principal object of this invention is to provide a calcium hypochlorite-sodium sulfate tablet which when immersed in water introduces a major proportion of its available chlorine into the body of water in a short time and continues to introduce lesser amounts of available chlorine over a more extended period.

Another object is to provide a tablet which in water dependably introduces a predetermined dosage of available chlorine.

Other objects appear in the following description of the invention.

The principal object of this invention is accomplished by preparing a compound tablet consisting of a core tablet which is slow-dissolving and introduces small amounts of available chlorine over a considerable period of time and a shell which is fast-dissolving and introduces a major proportion of available chlorine quickly.

For the manufacture of the core tablet, a core mixture is required for tabletting. The shell requires a core aggregate which may be a core tablet or other aggregate which is crushed and screened to separate a suitable mesh core fraction. The core fraction is diluted with inert salt to form a shell mixture and this is used to form the shell.

The core mixture is produced by intimately admixing 0.8 to 2 parts by weight of particles of anhydrous sodium sulfate and one part by weight of particles of calcium hypochlorite, all of said particles passing 30 mesh and at least 25 percent by weight of the particles of each component of said mixture passing 100 mesh U.S. Standard screens.

Suitable calcium hypochlorite for the purposes of the present invention contains 70 percent or more of available chlorine. The fine material useful in the core tablets of the present invention is obtained as a by-product in the manufacture of granular calcium hypochlorite which is sold commercially. However, other grades of calcium hypochlorite can be reduced to fines by comminution.

The specified size of the particles of calcium hypochlorite and sodium sulfate is important in the core tablet of the present invention. The very fine particles of calcium hypochlorite and sodium sulfate form fine crystals of gypsum which are thin needles usually under 10 microns in length. In contrast, larger particles of the reactants permit the formation of larger crystals of gypsum. Some of these larger particles may be in tablet or sheet form instead of in needle form, which are of less value in forming a firm core which will retain its form under some stress. In general, the crystals of gypsum form around but outside the particles of calcium hypochlorite, and are fed by the calcium solutions diffusing out of the particle.

The core mixture contains at least a stoichiometric proportion of sodium sulfate, taking into account any calcium compounds present in addition to calcium hypochlorite. (Lime and calcium chloride are commonly present in minor proportions in commercial calcium hypochlorite.)

Core tablets are formed, for example, in a conventional tabletting machine. Suitably the core tablets have a lesser diameter than the compound tablet into which they are incorporated. However, the core tablets may have the same diameter as the shell when it is desirable to form laminated compound tablets according to this invention.

The core aggregate can be formed by tabletting, "slugging," flaking, Chilsonating or otherwise converting the core mixture into compacted forms. All or only a part of the core mixture is tabletted. A portion of the core mixture can otherwise be compressed into the core aggregate which is used to form the shell mixture.

The core aggregate is required in the manufacture of the shell mixture to ensure thorough reaction of the sodium sulfate and calcium hypochlorite to form sodium hypochlorite and calcium sulfate when the shell mixture dissolves in water.

Chilsonating is accomplished by passing the core mixture through a "Chilsonator". This machine pre-compresses the powder mixture under 5 to 50 pounds and feeds it into the nip between a pair of oppositely driven rolls which are circumferentially corrugated and which bear against each other with a pressure of 10 to 60 tons per lineal inch. The resulting pressures on the powder mixture are about 50 to 500 tons per square inch. The corrugations consist of alternating ridges and valleys, curvilinear in cross-section, with the ridges truncated so that they do not penetrate to bottoms of the valleys. The shoulders of the ridges on one roll bear on the walls of the valleys in the opposite roll. The powder mixture is forced between the rolls which are driven at a rate of about 7 to 36 r.p.m. and the mixture is thus extruded in the form of a modified triangular prism. The base of the triangular cross-section is slightly concave, being formed by the corrugation on one roll. The sides of the triangle are formed by the corrugation on the other roll. From the mid-point of the base to the apex of the triangle is approximately one-eighth of an inch, and the width of the base is one-eighth of an inch. Thus all the material is less than 1/16 inch from a surface.

A core fraction is produced by crushing and screening the core aggregate to separate a fraction of particles through 20 on 100 mesh. Oversize is re-crushed and re-screened; undersize is recycled to the compacting operation.

The shell mixture contains calcium hypochlorite and sodium sulfate in the same proportions as in the core mixture and, in addition, from 5 to 25 parts of inert diluent alkali metal salt to contribute fast dissolving properties. The diluent salt is also suitably composed of particles substantially all of which pass 20 and are retained on 100 mesh U.S. Standard screens. Coarser materials do not bind well into a tablet and finer materials produce tablets which are not fast dissolving.

In the shell mixture, suitable inert diluent salts are water-soluble alkali metal salts which are non-reactive with calcium hypochlorite and which do not adversely affect its stability. Sodium chloride and sodium nitrate are especially useful as inert diluent salts which are stable to and otherwise compatible with calcium hypochlorite. Both are advantageously readily soluble in water and facilitate rapid dispensing of the available chlorine to the body of water to which the tablets are added. Other suitable inert diluent salts include potassium chloride, potassium nitrate, lithium chloride and sodium chlorate. The proportion of inert diluent salt can be as much as 90 percent of the shell mixture when it is desired to produce a composition which dissolves very rapidly. For example, so-called "butterflake" salt having an apparent density of 0.7 to 0.9 is suitable.

One mode of forming the compound tablets of this invention is by preparing a mixture in suitable proportions of the finely divided calcium hypochlorite and anhydrous sodium sulfate specified above for the core mixture and forming the mixture under pressure into tablets, crushing these core tablets and screening to separate a core fraction of particles through 20 on 100 mesh, admixing with this core fraction a stable inert diluent salt (also through 20 on 100 mesh) and tabletting at least one core tablet within a matrix of the above-described shell mixture. To accomplish this, core tablets may be laid on a bed of shell material in a tabletting die, covered with additional shell material and compressed into a compound tablet. The core tablet preferably has a lesser diameter than that of the core tabletting die used in forming the compound tablet. However, the core tablet may be of equal diameter when it is desired to produce a laminated compound tablet of at least two layers. To accomplish this, in a hand tabletting machine, a portion of core mixture of the composition and mesh size specified is first pressed in a partially filled tabletting die, the plunger is removed and a portion of shell material is introduced into the die on top of the formed core mixture and the tabletting is completed. This procedure produces a laminated compound tablet having core and shell portions.

A surprising feature of this invention is that when the compound tablets of the specified composition are immersed in water the shell dissolves rapidly and this introduces large amounts of sodium hypochlorite into the water. However, the core portion dissolves more slowly, and supplies available chlorine at a reduced rate over a longer period of time. Regulations vary in different states usually specifying a minimum amount of available chlorine to be initially dissolved within, say 0.5 hour and a minimum time, say 8 hours, during which a specified level is to be maintained. The relative proportions by weight of the core and shell portions and the proportion of diluent salt can be varied to produce tablets which will introduce available chlorine at these specified rates. Ordinarily the core does not exceed 60 percent by weight of the compound tablet and it may be as little as 10 percent of the total. The shell varies from 90 percent in the tablets designed to introduce available chlorine at the most rapid rate to 40 percent when the initial demand is minimum.

The product of this invention meets many of the needs of field water treatment, in swimming pools and wash tanks in restaurants and bars. The product can be packaged in various ways according to the use to which it is to be put. Generally, the purpose of the material is to supply available chlorine to a body of water. In some applications, the tablets of the present invention are added directly to the water to be treated. Alternatively the tablets may be placed in a perforated container and this container immersed in a large tank of water. The mass of tablets remains loosely packed, quite porous and easily leached by water. With water at room temperature or above, the available chlorine in the shell is substantially all released within one hour. For field use in military maneuvers, the perforated container may be formed of a polyethylene bag containing perforations, which may be uniformly applied to the polyethylene. The shells dissolve quickly leaving the core tablets visible thru the wall of the bag showing that they are still dispensing available chlorine. In this use, the presence, in the treated water, of a small amount of solids including a portion of the calcium sulfate derived from the calcium hypochlorite, is not as important as an initial fast rate of release of the available chlorine content. The solid matter and the calcium in solution or present as calcium sulfate may impede somewhat the subsequent filtration of the treated water but overall, the faster release of the available chlorine is more important. Accordingly, for such use, the compound tablets are suitably packed in perforated bags or other very porous containers which may permit a minor portion of the solids to pass out along with the sodium hypochlorite solution.

Where the available chlorine is to be supplied as sodium hypochlorite solution substantially free from solid matter, the tablets are suitably placed in a porous bag, made from a web of laid, hypochlorite-resistant fibers, suitably having a porosity of 0.01 to 1.0 by the Gurley Hill test described in TAPPI (Technical Association of the Pulp and Paper Industry) Method T460 m–49. The compound tablets in such porous bags are particularly advantageous, for example, in restaurants and bars. The feel of the residual core tablets in the bags is substantial proof that available chlorine is still being dispensed. In contrast, if granular sodium sulfate and granular calcium hypochlorite is placed in bags, the mass forms a somewhat solid lump, from which the sodium hypochlorite leaches out slowly for some time. The appearance of the lump in the bag does not assure the customer as the tablets do.

FIGURE 1 attached shows the rate of introduction of available chlorine into a body of water by several of the products described in the examples herein. Curve A shows the behavior of Tablet No. 4 of Example I. It dissolved rather slowly at first and introduced considerable of its available chlorine after two hours. Curve B represents Tablet No. 3 of Example I which dissolved more rapidly than Tablet No. 4 and introduced 60 p.p.m. of available chlorine in 0.5 hour. Tablets Nos. 1 and 2 of Example I dissolved slightly more rapidly than No. 3. Curve C represents the product of Example VII which introduced 81 p.p.m. of available chlorine in 0.66 hour and continued to provide available chlorine for nearly 8 hours. Curve D represents the fast dissolving tablet of Example V which maintained a high level of available chlorine in the water. Curve E represents the dissolution rate of the tablet of Example VI which rapidly introduced available chlorine initially but added later increments at a somewhat lower rate. Other tablets of the examples showed curves within the limits of Curves A and D. These curves show the versatility possible within the limits of this invention.

*Example 1*

A mixture of equal weights of calcium hypochlorite ("HTH") fines and anhydrous sodium sulfate was tableted to form core tablets measuring 3/8 inch in diameter and having various weights and thicknesses. The starting materials including the butterflake salt subsequently used, showed the following screen analysis:

TABLE I

| Screen | Weight Percent | | |
|---|---|---|---|
| | "HTH" | $Na_2SO_4$ | Salt |
| On 30 mesh | 0 | 0 | 0 |
| On 50 mesh | | | 79.7 |
| On 70 mesh | 18.3 | 15.0 | 14.2 |
| On 100 mesh | 32.0 | 57.0 | 4.2 |
| On 200 mesh | 32.0 | 24.6 | 1.9 |
| Through 200 mesh | 17.7 | 3.4 | |
| | 100.0 | 100.0 | 100.0 |

For the shell, some of the core tablets were ground and screened separating a fraction through 20 on 50 mesh. Mixtures of various proportions of this fraction and butterflake salt were blended. A bed of the shell mixture was formed by partly filling a 3/4 inch diameter tabletting die, one of the unground core tablets was laid on the bed and the compound tablet was formed with additional quantities of the shell mixture. Composite tablets were prepared using the different proportions of materials shown in the Table II below. All the tablets contained the same weight of available chlorine. Table II also shows the available chlorine content of one gallon of water at 30° C. in which was immersed a sealed envelope of laid Dacron (polyethylene terephthalate) fiber containing one of the compound tablets.

TABLE II

| | Table No. | | | |
|---|---|---|---|---|
| | 1 | 2 | 3 | 4 |
| Composition: | | | | |
| Core, grams | 0.90 | 1.00 | 1.14 | 1.20 |
| Shell: | | | | |
| HTH-$Na_2SO_4$, grams | 0.64 | 0.54 | 0.44 | 0.34 |
| Salt, grams | 3.36 | 2.96 | 2.96 | 2.96 |
| Available chlorine in solution: | | | | |
| In 0.5 hour | 60 | 64 | 60 | 45 |
| 1 hour | 82 | 79 | 72 | 60 |
| 2 hours | 105 | 96 | 90 | 79 |
| 4 hours | 123 | 117 | 113 | 103 |
| 7 hours | 140 | 135 | 134 | 126 |
| 10 hours | | | | 140 |

These data show rapid release of available chlorine to the water and control of the rate by the relative proportion of calcium hypochlorite in the core and in the shell of the composite tablet.

*Example II*

Core tablets each weighing 0.66 gram were prepared as described in Example I. Some of these tablets were ground and screened, separating fractions of the mesh size shown in column (2) of Table III. Compound tablets were prepared as described in Example I using one of the unground 0.66 gram core tablets in each compound tablet. The shell of these compound tablets was composed of 0.75 gram of the screen fraction indicated in column (2) of Table III with 3.25 grams of butterflake salt. Each compound tablet was placed in a laid Dacron fiber envelope which was then heat sealed and suspended in one gallon of water. Table III shows the available chlorine content of the water after various intervals.

TABLE III

| Tablet No. | Mesh Size | Available Chlorine in Solution, p.p.m.[2] | | | 2.0 hr. |
|---|---|---|---|---|---|
| | | 0.25 hr. | 0.5 hr. | 1.0 hr. | |
| (1) | (2) | (3) | (4) | (5) | (6) |
| 1 | [1]−20+100 | 48.7 | 71.5 | 92.0 | 106.0 |
| 2 | −20+70 | 54.8 | 82.8 | 101.3 | 110.3 |
| 3 | −20+50 | 57.9 | 88.8 | 99.9 | 107.4 |
| 4 | −20+40 | 64.4 | 88.9 | 100.2 | 109.2 |
| 5 | −20+30 | 65.4 | 90.1 | 97.1 | 105.8 |
| 6 | −10+20 | 56.8 | 83.6 | 93.3 | 102.3 |

[1] Through 20 mesh and on 100 mesh U.S. Standard screens.
[2] Parts per million.

These tablets are suitable for various purposes. Where it is required to introduce 75 parts per million of available chlorine into the water within 0.5 hour, Tablets Nos. 2 through 6 are suitable. Where the requirement is only 60 parts per million in 0.5 hour, Tablet No. 1 is suitable. The shell of Tablet No. 1 is made of finer mesh HTH-$Na_2SO_4$ material and is slower dissolving than the tablets made of generally coarser material. Tablet No. 6 is composed of coarse (−10+20) particles which themselves approach the rate of solution of the core itself. For these reasons, mesh sizes through 20 on 30 to through 20 on 70 are preferred for most purposes.

Tablets Nos. 2 through 5 are especially suitable for use in the final rinse tank in restaurant dishwashing operations.

*Example III*

The tablets of this example were prepared for use in a splash pool to provide a rapid initial rate of available chlorine release to provide at least 0.4 p.p.m., followed by a continuous release for 10 hours. This initial chlorine release is somewhat higher than for a swimming pool to compensate for the greater contamination encountered in splash pools.

The composite tablet of this example had a core and a shell portion. The shell portion was ⅞ inch in diameter and weighed 2.5 grams. It contained 2.135 grams of sodium chloride and 0.365 gram of a 50—50 calcium hypochlorite-sodium sulfate mixture, Chilsonated, crushed and screened to separate a —20+70 mesh fraction. Encased in the shell was a ¾ inch diameter core tablet of 3.5 grams of 50—50 calcium hypochlorite-sodium sulfate. The composite tablet sealed in a porous Dacron bag, was hung on the side of a splash pool 6 feet in diameter containing 8 inches of water. In 30 minutes the pool water showed 0.4 p.p.m. and at 1 hour, 0.6 p.p.m. available chlorine. During the next hour 0.27 p.p.m. were released. The tablet continued to discharge available chlorine for 10 hours, reaching a total of 2.04 p.p.m.

*Example IV*

Tablets for a kiddie splash pool are required to provide rapid initial release of available chlorine to at least 0.4 p.p.m. available chlorine, followed by a continuous release over about 8 hours, with total available chlorine of about 2 p.p.m. Because of the heavy contamination involved with play in splash pools, the desired level of chlorine release is somewhat more than would be required for swimming pools.

Composite tablets were preapred which were ¾ inch in diameter. The core part of each tablet consisted of 3 grams of 50—50 HTH-$Na_2SO_4$ mixture softly pressed into a tablet. The shell part consisted of 3 grams made up of 2.44 grams of butterflake salt and 0.56 gram of a 50—50 HTH-$Na_2SO_4$ mixture, Chilsonated, crushed and screened to separate a —20+50 mesh screen fraction. The shell mixture was loaded onto the core part in the same die and the whole was hard-pressed into a composite tablet.

Each composite tablet was sealed in a 3 x 4 inch envelope of laid Dacron fibers and the envelope was immersed in 8 inches of water in a splash pool 6 feet in diameter. In 30 minutes the water showed 0.6 p.p.m. and at one hour, 0.8 p.p.m. of available chlorine. About 0.3 p.p.m. was released during the next hour, and the total available chlorine content of the tablet was released after 8 hours to introduce 2.06 p.p.m. of available chlorine into the water.

*Example V*

Composite tablets were prepared as described in Example I have cores of 0.66 gram. Each shell was composed of 1.03 gram of 50—50 HTH-$Na_2SO_4$ (—20+50 mesh) and 2.81 grams of butterflake salt. Tested as described in Example I, the available chlorine content of the water was as shown in Table IV:

TABLE IV

| Time, hrs.: | Av. Cl, p.p.m. |
|---|---|
| 0.5 | 95.5 |
| 1.0 | 113 |
| 2.0 | 123 |
| 4.0 | 137.5 |
| 6.0 | 147.5 |

These tablets provide initial available chlorine extremely rapidly and are useful where large amounts of germicide are initially required and a safe level is to be maintained over an extended period.

*Example VI*

Composite tablets were prepared as described in Example I having cores of 0.66 gram. Each shell was composed of 0.75 gram of 50—50 HTH-$Na_2SO_4$ (—20+50) and 3.09 grams of butterflake salt. Tested as described in Example I, the available chlorine content of the water was as shown in Table V:

TABLE V

| Time, hrs.: | Av. Cl, p.p.m. |
|---|---|
| 0.25 | 55.5 |
| 0.5 | 79.5 |
| 1.0 | 88.0 |
| 2.0 | 97.0 |
| 4.0 | 109.8 |
| 6.0 | 120.8 |

*Example VII*

Composite tablets ⅞ inch in diameter and weighing 4.0 grams were prepared as described in Example I. Each had a core of a ⅜ inch diameter 0.94 gram tablet of 50—50 HTH-$Na_2SO_4$ and a shell composed of 0.75 gram of 50—50 HTH-$Na_2SO_4$ (—20+70) mixture and 2.31 grams of butterflake salt. Tested as described in Example I, the tablet introduced available chlorine into the water as shown in Table VI:

TABLE VI

| Time, hr.: | Av. Cl, p.p.m. |
|---|---|
| 0.33 | 68 |
| 0.66 | 81 |
| 1.0 | 88 |
| 2.0 | 101 |
| 4.55 | 125 |
| 7.7 | 145.5 |

*Example VIII*

Core tablets each weighing 0.66 gram were prepared as described in Example I. Some of these tablets were ground and screened, separating a fraction through 20 on 50 mesh. Compound tablets were prepared as described in Example I using one of the unground 0.66 gram core tablets in each ⅞ inch compound tablet. The shell of these compound tablets was composed of 0.75 gram of the —20+50 fraction of HTH-$Na_2SO_4$ and 3.25 grams of diluent salt. Each compound tablet was placed in a laid Dacron fiber envelope which was then heat sealed and suspended in one gallon of water. Table VII shows the available chlorine content of the water after various intervals.

TABLE VII

| Tablet No. | Diluent | Available Chlorine in Solution, p.p.m. | | | | | |
|---|---|---|---|---|---|---|---|
| | | 0.25 hr. | 0.5 hr. | 1 hr. | 2 hr. | 4 hr. | 8 hr. |
| 1 | Sodium Chlorate | 68 | 75 | 87 | 102 | 117 | 130 |
| 2 | Lithium Chloride | 46 | 81 | 93 | 108 | 122 | 136 |
| 3 | Potassium Chloride | 61 | 71 | 87 | 101 | 113 | 124 |
| 4 | Potassium Nitrate | 54 | 82 | 103 | 115 | 126 | 136 |

*Example IX*

Core tablets ¼ inch in diameter and weighing 0.45 gram each were prepared using 1.5 parts by weight of the sodium sulfate and 1 part of the "HTH" described in Example I, Table I.

A shell mixture was prepared by Chilsonating a mixture of equal parts of the same sodium sulfate and "HTH," crushing and screening to separate a —20+70 mesh fraction, adding 10 parts of diluent salt to 2 parts of this fraction and mixing thoroughly.

The compound tablets were prepared by tabletting 3.1 grams of the shell mixture into a ⅞ inch tablet enclosing two of the core tablets within each shell. In water, the shell of the compound tablet dissolved rapidly and the core persisted for several hours.

What is claimed is:
1. A tablet consisting of a core and a shell:
   (A) Said core having the form of a tablet consisting essentially of 0.8 to 2 parts by weight of particles of anhydrous sodium sulfate and one part by weight of calcium hypochlorite, all of said particles prior to tabletting passing 30 mesh and at least 25 percent by weight of the particles of each of said components passing 100 mesh;
   (B) Said shell at least partially enclosing said core and consisting essentially of a compressed mixture of 5 to 25 parts by weight of particles of inert diluent alkali metal salt, 0.8 to 2 parts of particles of anhydrous sodium sulfate and one part of particles of calcium hypochlorite, substantially all of said particles prior to compression passing 20 mesh and retained on 100 mesh.

2. The tablet of claim 1 in which the alkali metal salt is sodium chloride.

3. The tablet of claim 1 in which the alkali metal salt is potassium nitrate.

4. The tablet of claim 2 in which the alkali metal salt is sodium chlorate.

5. The method of preparing a tablet by the steps of:
   (A) Mixing 0.8 to 2 parts by weight of particles of anhydrous sodium sulfate and one part by weight of particles of calcium hypochlorite, all of said particles passing 30 mesh and at least 25 percent by weight of the particles of each of said sodium sulfate and said calcium hypochlorite passing 100 mesh, to form a core mixture;
   (B) Compressing said core mixture to form core aggregates, at least a portion of said core aggregates having the form of core tablets;
   (C) Retaining at least a portion of said core tablets and crushing and screening the remainder of said core aggregates to separate a core fraction passing 20 mesh and retained on 100 mesh;
   (D) Mixing 1.8 to 3 parts by weight of said core fraction with 5 to 25 parts by weight of inert diluent alkali metal salt passing 20 mesh and retained on 100 mesh, to form a shell mixture;
   (E) Tabletting at least one of said core tablets intimately with said shell mixture to form a tablet.

6. The method of preparing a tablet by the steps of:
   (A) Mixing 0.8 to 2 parts by weight of particles of anhydrous sodium sulfate and one part by weight of particles of calcium hypochlorite, all of said particles passing 30 mesh and at least 25 percent by weight of the particles of each of said sodium sulfate and said calcium hypochlorite passing 100 mesh, to form a core mixture;
   (B) Tabletting said core mixture to form core tablets;
   (C) Crushing a portion of said core tablets and screening the crushed tablets to separate a screen fraction substantially all of which passes 20 mesh and is retained on 100 mesh;
   (D) Mixing 1.8 to 3 parts by weight of the said screen fraction with 5 to 25 parts of inert diluent alkali metal salt to form a shell mixture;
   (E) Tabletting at least one of said core tablets within a matrix of said shell mixture.

7. The method of preparing a tablet by the steps of:
   (A) Mixing 0.8 to 2 parts by weight of particles of anhydrous sodium sulfate and one part by weight of particles of calcium hypochlorite, all of said particles passing 30 mesh and at least 25 percent by weight of the particles of each of said sodium sulfate and said calcium hypochlorite passing 100 mesh, to form a core mixture;
   (B) Compressing said core mixture to form core aggregates, crushing and screening said core aggregates to separate a core fraction passing 20 and retained on 100 mesh;
   (C) Mixing 1.8 to 3 parts by weight of said core fraction with 5 to 25 parts by weight of particles of inert diluent alkali metal salt, substantially all of said particles passing 20 mesh and retained on 100 mesh, to form a shell mixture;
   (D) Tabletting one of said core mixtures and said shell mixture in a partially filled tabletting die, removing the tabletting plunger, adding the other of said core mixture and said shell mixture and tabletting the two said mixtures together to form said tablet.

8. The method of preparing a tablet by the steps of:
   (A) Mixing 0.8 to 2 parts by weight of particles of anhydrous sodium sulfate and one part by weight of particles of calcium hypochlorite, all of said particles passing 30 mesh and at least 25 percent by weight of the particles of each of said sodium sulfate and said calcium hypochlorite passing 100 mesh, to form a core mixture;
   (B) Tabetting one portion of said core mixture to form core tablets;
   (C) Extruding the other portion of said core mixture under a pressure of 50 to 500 tons per square inch to produce core aggregates having the form of modified triangular prisms with one rounded edge opposite a concave side;
   (D) Crushing and screening the said core aggregates to separate a core fraction passing 20 mesh and retained on 100 mesh;
   (E) Mixing 1.8 to 3 parts by weight of said core fraction with 5 to 25 parts by weight of inert diluent alkali metal salt passing 20 mesh and retained on 100 mesh, to form a shell mixture;
   (F) Tabletting at least one of said core tablets intimately with the shell mixture to form a tablet.

9. An article of manufacture consisting of the tablet of claim 1 enclosed in a sealed envelope of laid, hypochlorite-resistant fibers having a porosity of 0.01 to 1.0.

10. The article of claim 9 in which said fibers are polyethylene terephthalate.

References Cited by the Examiner
UNITED STATES PATENTS

| | | | |
|---|---|---|---|
| 871,612 | 11/1907 | Nesfield | 167—18 |
| 1,678,987 | 7/1928 | MacMahon | 167—18 |
| 2,736,682 | 2/1956 | Hermelin | 167—82 |
| 2,887,438 | 5/1959 | Cooper et al. | 167—82 |
| 2,987,445 | 6/1961 | Levesque | 167—82 |
| 3,062,720 | 11/1962 | Costello | 167—82 |

JULIAN S. LEVITT, *Primary Examiner.*

FRANK CACCIAPAGLIA, Jr., *Examiner.*

GEORGE A. MENTIS, *Assistant Examiner.*